(12) United States Patent
Aufrere et al.

(10) Patent No.: US 7,237,839 B2
(45) Date of Patent: Jul. 3, 2007

(54) AUTOMOBILE VEHICLE SEAT WITH HINGED BACK FEATURING MEANS FOR BLOCKING THE SEAT BACK IN THE EVENT OF FRONT CRASH

(75) Inventors: Christophe Aufrere, Marcoussis (FR); Fabrice Charras, Paris (FR); Slawomir Klukowski, Paris (FR); Gérald Thevenot, Chamarande (FR)

(73) Assignee: Faurecia Sieges d'Automobile, Nanterre (FR)

( * ) Notice: Subject to any disclaimer, the term of this patent is extended or adjusted under 35 U.S.C. 154(b) by 442 days.

(21) Appl. No.: 10/888,537

(22) Filed: Jul. 9, 2004

(65) Prior Publication Data

US 2005/0023870 A1 Feb. 3, 2005

(30) Foreign Application Priority Data

Jul. 10, 2003 (FR) .................................. 03 08432

(51) Int. Cl.
*B60N 2/42* (2006.01)
(52) U.S. Cl. ................................. 297/216.13
(58) Field of Classification Search .......... 297/216.13, 297/216.14, 216.19, 216.2, 216.16, 216.1
See application file for complete search history.

(56) References Cited

U.S. PATENT DOCUMENTS

| 4,103,967 | A | 8/1978 | Tanaka et al. |
| 4,118,067 | A | 10/1978 | Tanaka |
| 4,318,569 | A | 3/1982 | Bilenchi et al. |
| 4,365,837 | A | 12/1982 | Mizelle |
| 5,722,730 | A | 3/1998 | McKernan |
| 5,842,744 | A * | 12/1998 | Harmon .................. 297/378.11 |
| 6,209,955 | B1 | 4/2001 | Seibold |
| 6,409,263 | B1 * | 6/2002 | Seibold .................. 297/216.13 |
| 6,533,351 | B2 * | 3/2003 | Deptolla .................. 297/216.2 |
| 6,893,093 | B2 * | 5/2005 | Nock et al. .................. 297/367 |

FOREIGN PATENT DOCUMENTS

| DE | 40 31 285 | 4/1992 |
| DE | 196 22 157 | 12/1997 |
| EP | 0 564 962 | 10/1993 |
| EP | 0 832 780 | 4/1998 |

* cited by examiner

*Primary Examiner*—Milton Nelson, Jr.
(74) *Attorney, Agent, or Firm*—Patterson, Thuente, Skaar & Christensen, P.A.

(57) ABSTRACT

The automobile vehicle seat features a seat back hinged on the seat pan and device for blocking the seat back with respect to the seat pan in the event of forward impact. The automobile vehicle seat features a height adjustment mechanism. The device for blocking the seat back includes a cam pivot-mounted on the shaft, and a weight joined to the cam, with the cam arranged so upon impact the cam, pivots by the inertia of the weight and the cam engages with a lower edge of the seat back frame, such that pivoting of the seat back is prevented by bracing of the cam against the lower edge and such that this produces a high radial force on the height adjustment shaft, thereby limiting the possibilities of rotation of the height adjustment shaft.

8 Claims, 4 Drawing Sheets

AUTOMOBILE VEHICLE SEAT WITH HINGED BACK FEATURING MEANS FOR BLOCKING THE SEAT BACK IN THE EVENT OF FRONT CRASH

CLAIM TO PRIORITY

The present application claims priority under 35 USC § 119 to a French national patent application, FRANCE No. 0308432, filed Jul. 10, 2003, and entitled "Automobile Vehicle Seat with Hinged Back Featuring Means for Blocking the Seat Back in the Event of Front Crash."

FIELD OF THE INVENTION

This invention concerns an automobile vehicle seat with a hinged seat back, that is to say with a seat back that pivots on the seat pan, and featuring means for blocking the seat back in the event of front crash or forward impact.

BACKGROUND OF THE INVENTION

We already know of seats "with an integrated seat-belt," that is to say in which an upper attaching point of the seat belt is joined to the upper part of the seat back. With a seat of this type, in the event of forward impact, the seat occupant, who has fastened the seat belt, is projected forwards by the forces of inertia and exerts a substantial load on the seat belt, which transmits this load to the seat back. This results in a high torque on the mechanism hinging the seat back on the seat pan.

In the event of a violent impact, this torque load can be very high and exceed the withstand capacities of the seat back tilt adjustment mechanisms, or conventional system for locking the seat back in position. Consequently, the seat back risks pivoting forwards, pulled by the body of the passenger who, although held by the seat belt, can be projected against the windscreen or other parts of the vehicle passenger compartment.

Remedying this by increasing the mechanical strength of the hinging or locking systems would increase the overall dimensions, weight and cost of these systems, in a way that is unnecessary for normal use of the seat.

Document WO 92/05978 describes a system intended to prevent pivoting of the seat back in the event of collision, this system being independent of the means for adjusting the seat back tilt angle or locking it in position. This system features a pivoting cam mounted on the seat pan frame, near the lower extremity of the seat back frame, and which can engage in the arc-shaped edge of the lower extremity of the frame during pivoting. Moreover, the cam features a weight positioned such that the cam is not engaged in the edge of the seat back frame when in the rest position, that is to say when the seat is not subjected to a strong deceleration force. However, if the vehicle is subject to a forward impact, the sudden deceleration causes the cam to pivot by inertia and engage in the lower edge of the seat back frame. If a high load then also tends to cause the seat back to pivot, the friction between the cam and the lower edge of the seat back also tends to rotate the cam, which, owing to its evolute shape, causes a jamming force that is proportional to the pivoting torque exerted on the seat back. To increase the friction, the lower edge of the seat frame and/or the cam can feature grooves or toothing that increase the engagement of the cam with the seat back and therefore further improve the bracing effect between them. This very rapidly results in total blocking of the seat back, preventing it in a totally reliable manner from pivoting forward with respect to the seat pan.

Nonetheless, some seats have systems for adjusting the seat pan position, usually consisting of a hinged link rod assembly mounted between the seat pan frame and seat runners that join the seat to the vehicle floor and are conventionally used for longitudinal (fore/aft) adjustment of the seat. The seat pan position adjustment system, commonly called a height adjuster, is usually designed to allow adjustment of the height of the seat pan, and often its tilt angle as well. Such a system is described for example in document FR 2.806.675.

A system of this type is also illustrated in FIGS. 1 and 2 appended. These figures show a partial illustration of a seat frame 1 and its connection to the floor 2 of an automobile vehicle. The frame 1 includes a seat pan frame 11 on which is mounted a seat back frame 12 which pivots around pivot axis A, and is linked to the seat pan frame by a known type of hinge mechanism 13, that allows adjustment of the seat back tilt angle with respect to the seat pan.

The seat pan frame is connected to the floor 2 by a system of runners comprising a fixed runner element 21 that is joined to the floor, and a moving runner element 22 to which the seat pan frame is connected by a set of link rods 23, 24 constituting the seat height adjustment mechanism. This mechanism features two front link rods 23 and two rear link rods 24, situated respectively on either side of the seat. The two rear link rods are rigidly connected on a shaft, conventionally consisting of a tube 25, called the height adjustment tube, such that they both pivot together through exactly the same angle. The height adjustment tube 25 is mounted so that it pivots in journal bearings 15 of the seat pan frame 11, and acts as the hinge pin for the rear link rods on the said seat pan frame. As can be seen clearly in FIG. 1, the seat pan frame 11, the moving runner element 22, the front link rods 23 and the rear link rods 24 form a deformable trapezoid, such that pivoting of the link rods causes combined vertical and longitudinal displacement of the seat pan, with the seat pan frame moving upward at the same time as it moves forward. The seat pan position is adjusted by actuating the pivoting of one of the rear link rods 24 through a rotary control knob 16 mounted on the seat pan frame and featuring a pinion 17 that meshes with a toothed quadrant 26 that is integrally machined in link rod 24. Blocking means of types known in themselves, such as are described in document 2.766.773 for example, lock the control knob in any position chosen by the user. The height adjustment mechanism can also be adjusted and blocked in position by other means, for example by an irreversible adjustment mechanism controlled by a pivoting lever, as is described in FR 2.792.264.

In the event of forward impact of the vehicle, the seat pan is subjected to a load that tends to move it forward, accompanying the body of the passenger occupying the seat. In the case of a seat with a built-in seat belt as mentioned earlier, the load transmitted to the seat back by the seat belt is retransmitted to the seat pan and finally to the height adjustment mechanism. The load to which this mechanism is subjected therefore has a horizontal component as well as a vertical component due to the torque exerted by the seat belt at the top of the seat back. The combination of these loads tends therefore to increase the pivoting torque of the height adjustment mechanism link rods all the more. The result is that if the cam system for blocking the seat back with respect to the seat pan is effective, it is the height adjustment mechanism that must withstand all the loads resulting from forward impact of the vehicle, caused by the inertia of the seat and above all the body of its occupant.

The aim of this invention is therefore to enhance the safety of passengers in such seats featuring a height adjustment mechanism and an integrated seat belt, by reinforcing both the blocking of the seat back position with respect to the seat pan, and the seat pan with respect to the runners attached to the vehicle floor.

With these aims in view, the subject of the invention is an automobile vehicle seat featuring a seat back hinged on the seat pan and means for blocking the seat back with respect to the seat pan in the event of forward impact, these blocking means comprising a cam pivot-mounted on the seat pan along a transverse axis and a weight joined to the cam, the cam being positioned such that in the event of impact it pivots through the inertia of the weight and engages with an arc-shaped lower edge of a seat back frame in a way that prevents pivoting of the seat back through the bracing of the cam against the said lower edge of the seat back frame.

More particularly, the invention is characterized in that the seat features a height adjustment mechanism comprising, among other things, rear link rods that pivot on the seat pan frame and are arranged such that their pivoting results in vertical and longitudinal displacement of the seat pan with respect to the vehicle floor, and with the rear link rods being rigidly connected in rotation by a height adjustment shaft whose axis is the pivot axis of the rear link rods and the ends of which are mounted to rotate in the journals bearings of the seat pan frame. The cam is mounted such that it pivots freely around the said shaft such that the bracing of the cam against the lower edge of the seat back frame results in the cam exerting a high radial load on the shaft, thereby limiting the possibility of the said shaft rotating.

Thus, as will be better understood later on, as soon as the load exerted by the seat belt on the seat back becomes high, and the higher it becomes, the bracing force increases accordingly and the cam is applied with a strong radial force against the shaft that acts as a support for it. This results in a substantial increase in the friction between the cam and shaft, and as the cam cannot rotate, it also acts in the same manner to prevent, or at least brake and slow down, rotation of the height adjustment shaft. Consequently, the link rods of the height adjustment mechanism are also blocked or at least braked in their pivoting movement with respect to the seat pan, which prevents movement of the seat pan with respect to the vehicle floor, or at least limits the loads applied to the height adjustment mechanism control and blocking means. The risks of movement of the seat assembly with respect to the floor owing to insufficient resistance of the height adjustment blocking mechanism in the event of forward impact of the vehicle are thus substantially reduced.

It will also be noted that the radial loads exerted by the cam on the shaft in the event of sudden deceleration are retransmitted to the shaft journal bearings. This results in an additional resisting friction torque that also limits the possibilities of the said shaft rotating through the increased friction of the shaft ends in the journal bearings on the seat pan frame.

In accordance with particular preferential arrangements, the said lower edge of the seat back frame comprises a notched sector of a circle that improves the engagement between the cam and the notches of the said sector, these notches preferably being asymmetrical and oriented in the direction that gives the best grip when the seat back tends to tilt forward.

In accordance with another particular arrangement, the cam features a first zone with a constant evolute followed by a zone with a curvature that corresponds more or less to that of the notched sector. Thus, when forward impact occurs, the cam pivots by inertia until it comes into contact with the sector at the bottom of the seat back frame, then, once engaged in the sector, it tends to continue its rotation driven by the seat back if the seat back tends to pivot forward. In doing this, the cam's more or less constant evolute, that is to say the fact that the radius of the cam increases regularly over the said first zone, means that the bracing force increases progressively by tending to push apart the pivot axes of the seat back and the cam, and therefore further increases the pressure between the seat back notched sector and the cam, accentuating their relative engagement and increasing the seat back resisting torque.

If the load on the seat back increases further, the additional pivoting brings the second zone of the cam into contact with the notched sector at the bottom of the seat back, where the appropriately designed curvature of this zone provides an increased surface of contact with the sector and therefore increases yet further the friction and engagement of the cam in the said sector, resulting in an even higher resisting torque preventing the seat pivoting forward.

In a complementary arrangement, the lower edge of the seat back frame features at a forward extremity of the notched sector a radial stop arranged to engage with the tip of the cam. Thus, by complementing the resisting torque already exerted as described above, and in the case where pivoting of the seat back should still continue, abutment of the said radial stop against the tip of the cam definitively prevents any further pivoting of the seat back.

It will be noted in passing that the increase in the loads on the cam resulting from the characteristics explained above also result in an increase in the forces applied by the cam on the height adjustment shaft. Consequently, the higher the loads exerted on the seat back, the more its pivoting with respect to the seat pan is limited, and the higher are the loads limiting the pivoting of the height adjustment link rods, and the more the risk of the seat pan moving with respect to the runners supporting the height adjustment mechanism is reduced.

Preferentially, the dimensional characteristics of the weight and its position with respect to the cam are determined such that the cam does not engage with the lower edge of the seat back frame as long as the deceleration force is less than 1 G, that is to say roughly as long as deceleration does not exceed that resulting from an emergency braking situation. On the other hand, the dimensional characteristics of the weight and its position with respect to the cam shall be determined such that the cam engages with the lower edge of the seat back frame when the deceleration force reaches about 1.5 G, as this value corresponds to the beginning of a forward impact. It will be noted in this respect that, after the beginning of engagement of the cam with the sector at the bottom of the seat back frame, the further engagement of the cam no longer depends on the deceleration force but only on the pivoting of the seat back, therefore even if the deceleration force decreases, blocking of the seat back and height adjustment mechanisms is maintained.

In yet another particular arrangement, the height adjustment shaft consists of a tube which, in the event of a violent impact, can deform by crushing under the forces exerted on it by the cam, with this deformation tending to prevent even further the rotation of the tube in the cam, and therefore prevent any movement of the height adjustment mechanism. It will however be noted that the cam is mounted on the height adjustment shaft or tube directly beside the seat pan frame to prevent the said shaft from bending, which would be prejudicial to the desired bracing and jamming effect.

Other characteristics and advantages will appear in the following description of a seat conforming to the invention.

DETAILED DESCRIPTION OF THE PREFERRED EMBODIMENTS

Figure 3:
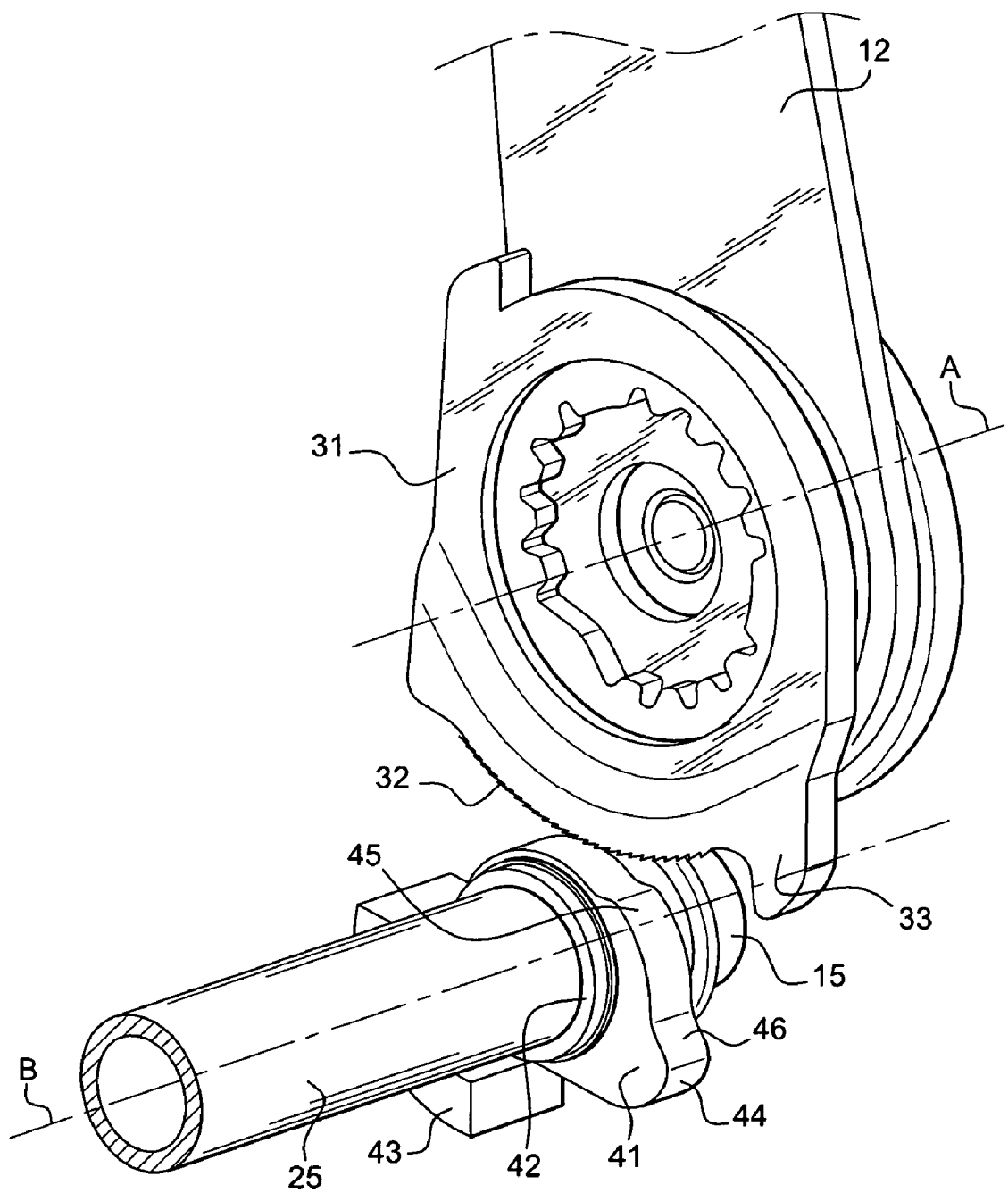
FIG. 3 is a detailed perspective view of the seat back-to-seat pan hinging point and the end of the height adjustment shaft, in which the link rod and the seat pan frame have been intentionally omitted to facilitate understanding of the design and functioning of the cam and the weight.

FIG. 3 provides a simplified illustration of the hinging system 13 linking the seat back frame 12 to the seat pan 11, through a pivot axis A. An add-on part 31 is joined to the lower extremity of the seat back frame 12, its bottom section featuring an arc-shaped notched sector 32 that is centered on axis A. Towards the front end of this sector, situated towards the front of the seat, that is to say to the right in FIGS. 3 to 6, the add-on part features a radial stop 33. The teeth of the notched sector are asymmetrical, that is to say the tips of the teeth are directed rearwards.

Figure 1:
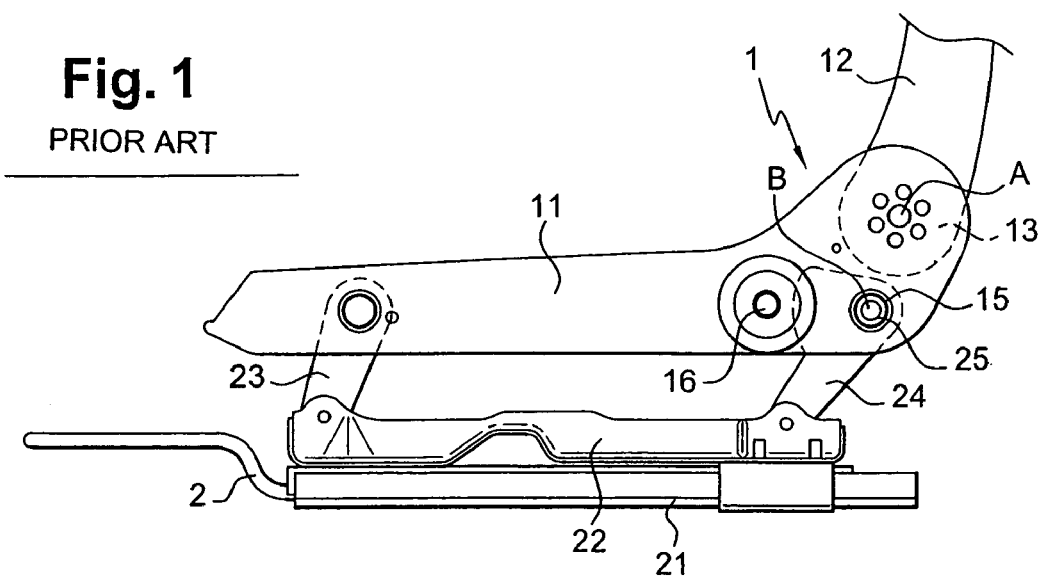
FIGS. 1 and 2 illustrating an earlier height adjustment mechanism design, have already been commented in the introductory section of this document.
Figure 2:
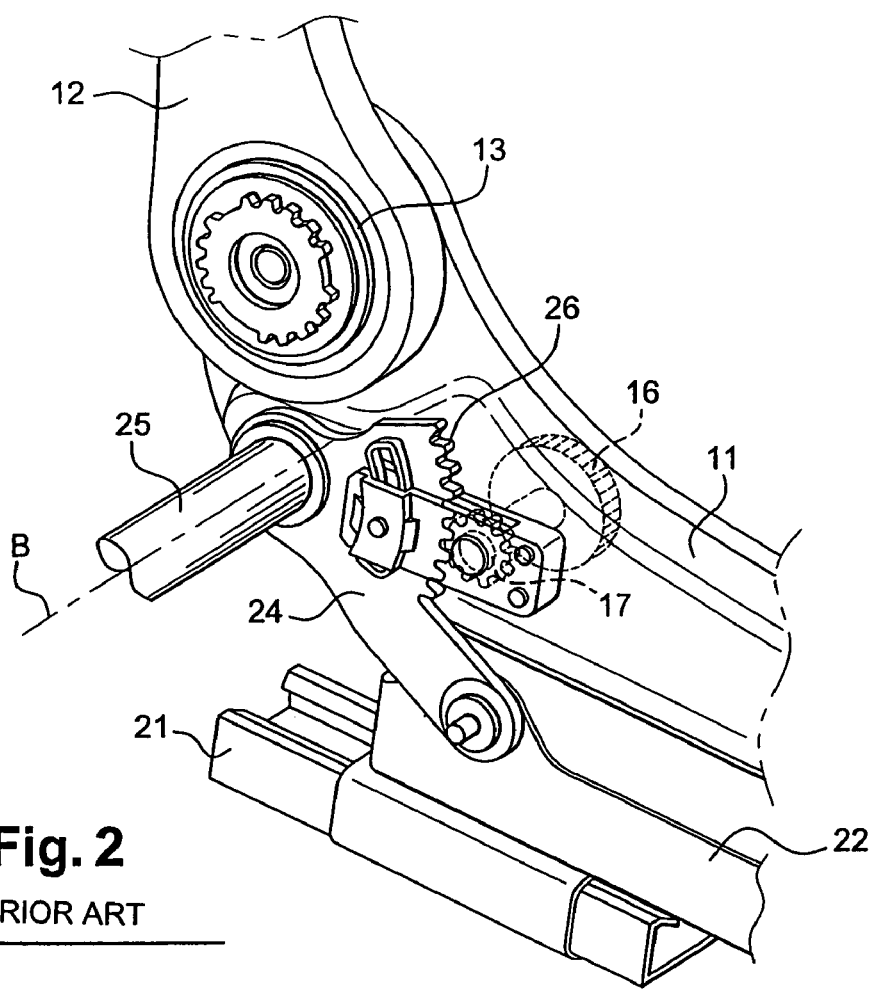

In the same vertical plane as the notched sector, a cam 41 is freely pivot-mounted about a traverse axis B on the height adjustment shaft 25 consisting of a metal tube on which the rear link rods 24 of the height adjustment mechanism are fixed, by welding for example. The ends of the height adjustment tube are held in journal bearings 15 joined to the seat pan frame, which guide its rotation as was described earlier with respect to FIG. 1. The cam is positioned on the height adjustment tube right beside the link rod 24 and is immobilized axially by a thrust washer 42, for example.

Figure 4:
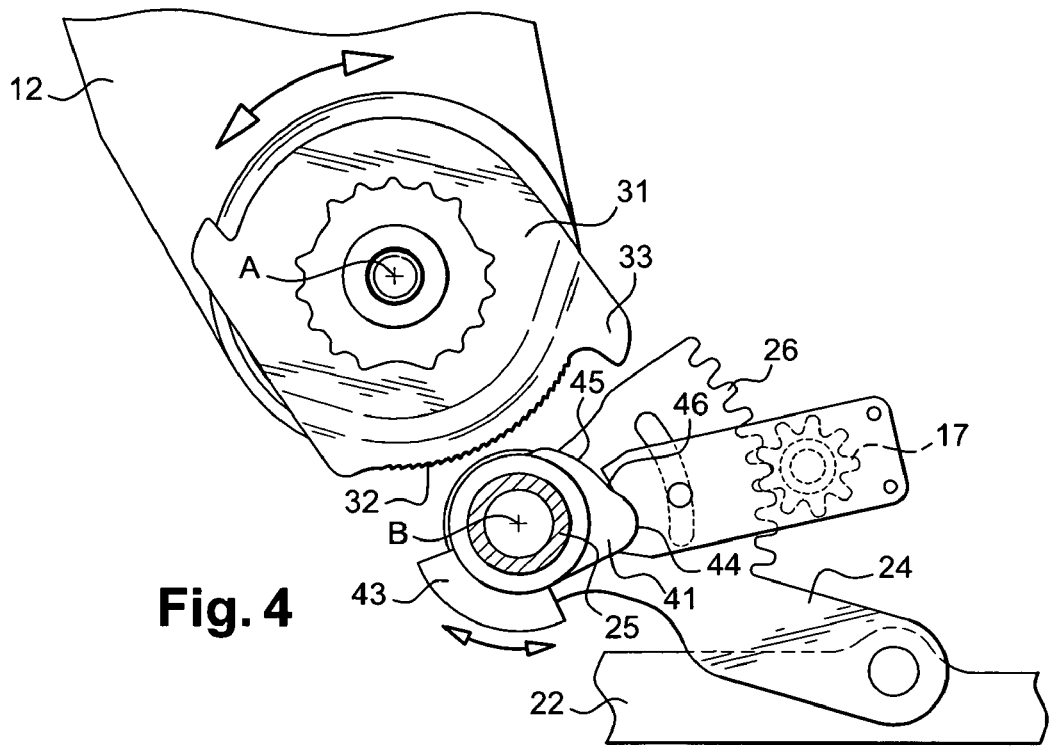
FIGS. 4 to 6 are detailed views of the seat back hinging zone and of a height adjustment link rod on the seat pan and of the blocking system in accordance with the invention, in the following three positions respectively: system inactive, engagement of system and ultimate blocking.

The cam 41 is joined to a weight 43 whose shape and dimensions are determined such that when in the rest position, as shown in FIGS. 3 and 4, the tip 44 of the cam is directed forwards, and its lateral surface is maintained at a distance from the notched sector 32, thereby allowing the seat back to pivot freely around its axis A. Furthermore, the cam features a first zone 45 with a constant evolute, that is to say whose radius increases regularly, followed by a second zone 46 before reaching the cam tip 44, the curvature of this zone 46 corresponding more or less to that of the notched sector 32, as can be seen in FIG. 6.

Figure 5:
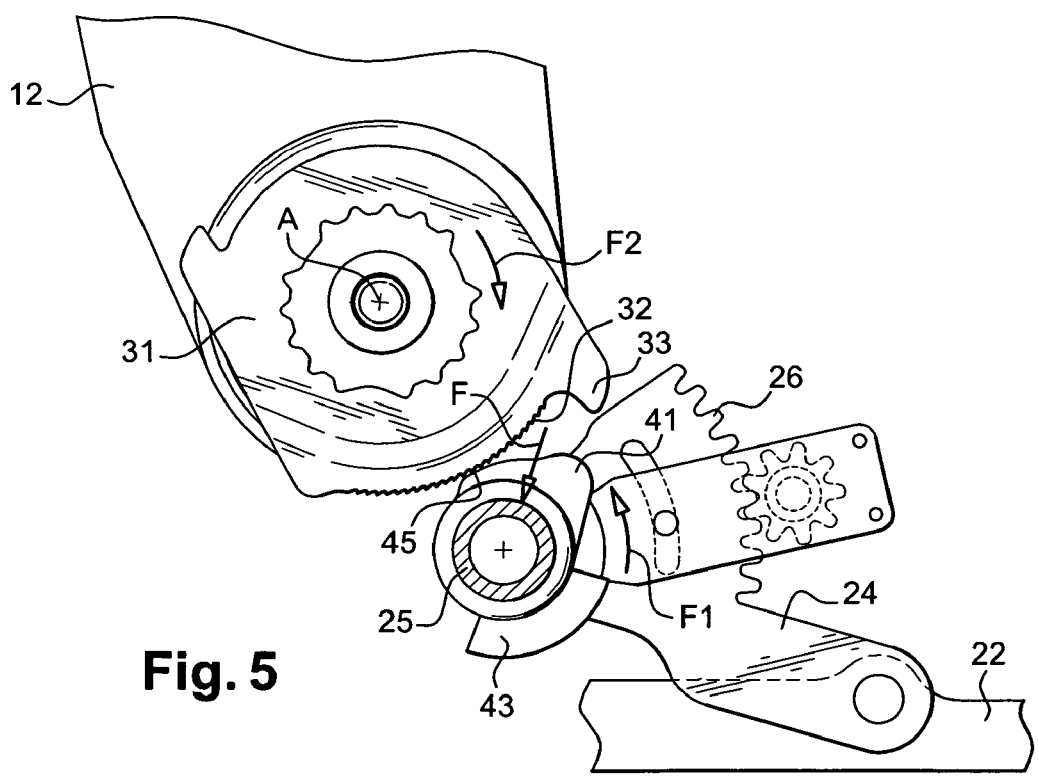
Figure 6:
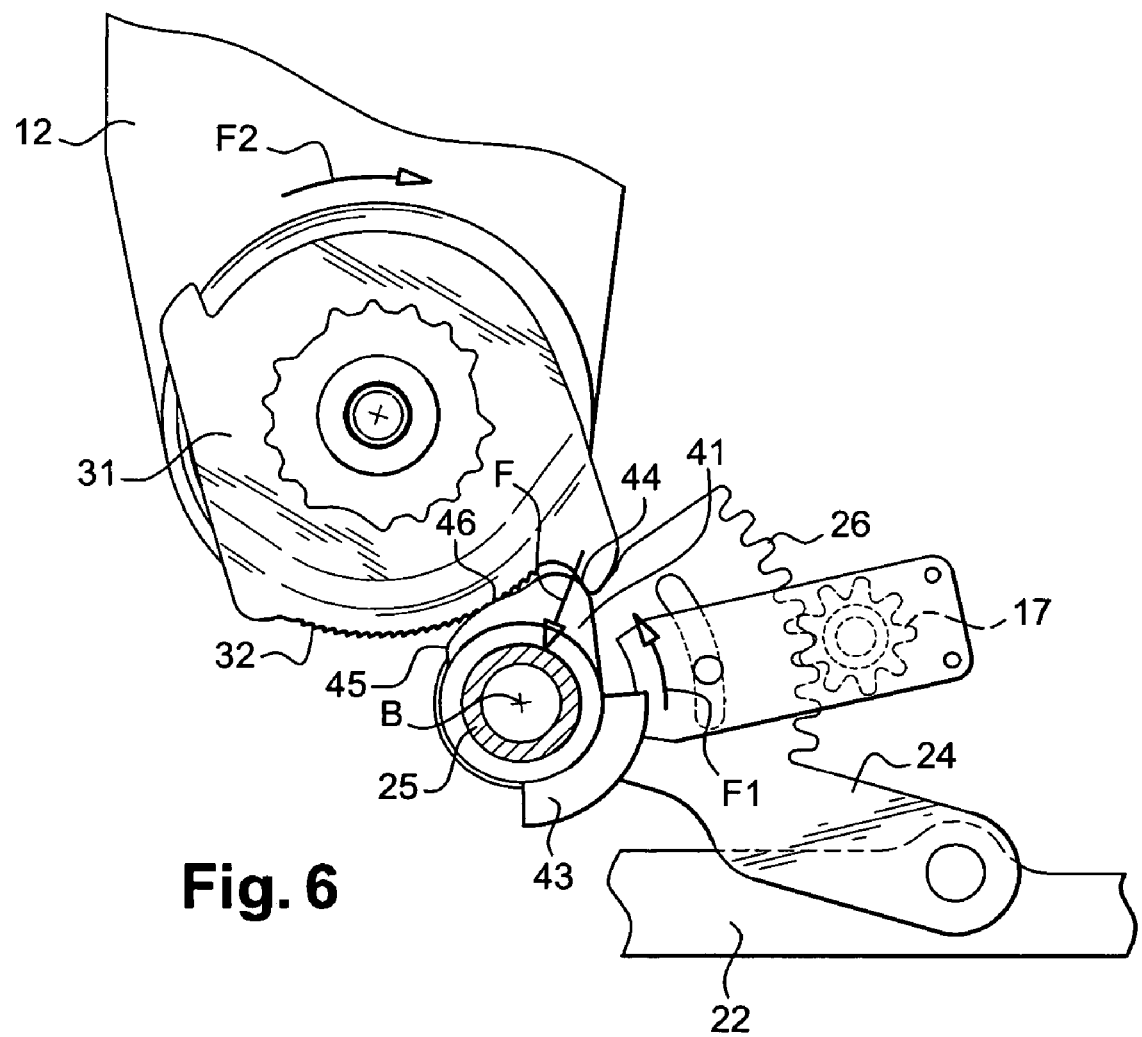

We will now describe the operation of the system in relation to FIGS. 4 to 6.

FIG. 4 shows the system with the seat in the normal utilization position, when the vehicle is traveling at virtually constant speed and consequently no force of inertia tends to pivot the cam 41 and its weight 43. In this situation, the cam remains in a stable equilibrium position, as can be seen in FIG. 4, where there is a minimum amount of space between the cam and the notched sector 32. The seat back angle can be freely adjusted by pivoting around axis A. Whatever the tilt angle adopted within the predetermined limits corresponding to the length of the notched sector, the distance between the notched sector and the cam remains constant. The cam 41 can pivot around the height adjustment tube 25 when the vehicle accelerates and decelerates, but the pivoting remains limited as long as the speed variations remain below a predetermined threshold, for example a deceleration force of about 1 G corresponding to emergency braking. Thus, as long as the deceleration of the vehicle has not reached this threshold, the cam does not pivot sufficiently to engage with the notched sector 32. In addition, the height adjustment mechanism can be actuated freely by the user to bring the link rods 24 into the position corresponding to the sitting position desired by the seat occupant.

When the vehicle is subjected to a strong deceleration force, of the order of 1.5 Gs or more, caused for example by a forward impact, the weight 43 tends to move forward by inertia, as shown in FIG. 5, causing it and the cam 41 to pivot around the height adjustment tube in the direction of arrow F1, until zone 45 of the cam comes into contact with the notched sector 32. When such a deceleration occurs, the seat back is pulled strongly in the forward direction by the safety belt attached to its upper section, which itself is pulled strongly forward by the inertia of the upper body of the seat occupant. This results in the notched sector pivoting towards the rear, as shown by arrow F2 in FIG. 5. In doing so, and as a consequence of the fact that the cam has come into contact with the teeth of the notched sector 32, an anchoring or friction effect followed by a driving effect occurs between the said notched sector and the cam, with the notched sector tending to rotate the cam, always in the direction of arrow F1. Owing to the shape of the cam, a wedging or bracing effect takes place between the cam 41 and the sector 32, and this effect increases as the seat back continues its pivoting movement, since the pivoting axes of the seat back and the cam are in a fixed position on the seat pan frame, and therefore have a constant distance between centers. Pivoting of the seat back is thus braked if not blocked.

If the forces exerted on the seat back continue to increase to the extent that the seat back continues to pivot forward, the notched sector 32 likewise continues to drive rotation of the cam until the second zone 46 of the cam comes into contact with the sector and its curvature more or less matches that of the said sector. In this situation the cam can no longer turn because its tip is more or less in contact with the sector, as in the position shown in FIG. 6. At the most, if the force on the seat back increases further and causes additional pivoting of the seat back by managing to make the notched sector slide against zone 46 of the cam, pivoting of the seat back will be definitively blocked when the stop 33 situated at the end of the notched sector comes into contact with the tip 44 of the cam, as shown in FIG. 6.

From the moment pivoting of the seat back causes pivoting of the cam, the resulting bracing produces a radial force F exerted by the cam on the height adjustment tube around which it pivots, and this force is transmitted via the said tube to its journal bearings 15 on the seat pan frame. This force F, which increases until the cam and the seat back are in the blocking position of FIG. 6, results in a large increase in the friction firstly between the cam 41 and the height adjustment tube 25, and secondly between the tube and its journal bearings 15. Once cam 41 stops moving because it is jammed against the notched sector, and as in addition the journal bearings 15 are also rigidly fixed on the seat pan, rotation of the height adjustment tube is strongly braked or even blocked by the above-mentioned friction forces. As a consequence, the resisting torque created by the height adjustment system blocking mechanism, which works to prevent pivoting of the link rods, is increased by the resisting torque resulting from these friction forces and thus better maintains the angle of the link rods and prevents the seat pan from moving with respect to the runners on which it is mounted.

The system in accordance with the invention thus ensures both effective blocking of the seat back and reinforces the height adjustment blocking mechanism if the vehicle is subject to forward impact.

What is claimed:

1. An automobile vehicle seat featuring a seat back hinged to a seat pan and means for blocking the seat back with respect to the seat pan in an event of a forward impact, the means for blocking comprising a cam pivot-mounted on the seat pan along a transverse axis and a weight joined to the cam, with the cam arranged such that, in the event of the forward impact, the cam pivots by an inertia of the weight, and the cam engages with an arc-shaped lower edge of a seat back frame such that pivoting of the seat back is prevented by bracing of the cam against the arc-shaped lower edge of the seat back frame, wherein the automobile vehicle seat comprises a height adjustment mechanism having rear link rods pivoting on a seat pan frame around a pivot axis and arranged such that pivoting of the rear link rods results in vertical and longitudinal movement of the seat pan in relation to a the vehicle floor, and the rear link rods are rigidly joined so that the rear link rods rotate together on a height adjustment shaft, the height adjustment shaft having a transverse axis that coincides with the pivot axis of the rear link rods and the height adjustment shaft having ends that are pivot-mounted in journal bearings of the seat pan frame, the cam being pivot-mounted on the height adjustment shaft such that bracing of the cam against the arc-shaped lower edge of the seat back frame produces a high radial force on the height adjustment shaft, thereby limiting rotation of the height adjustment shaft.

2. The automobile vehicle seat in accordance with claim 1, wherein the height adjustment shaft comprises a tube.

3. The automobile vehicle seat in accordance with claim 1, wherein the cam comprises a constant evolute zone followed by a second zone, the second zone having a curvature substantially corresponding to a curvature of a notched circular sector.

4. The automobile vehicle seat in accordance with claim 1, wherein dimensional characteristics of the weight and a position of the weight in relation to the cam are such that the cam does not engage with a notched circular sector of the seat back frame as long as vehicle deceleration is less than one g-force.

5. The automobile vehicle seat in accordance with claim 4, wherein dimensional characteristics of the weight and a position of the weight in relation to the cam are such that the cam engages with the notched circular sector of the seat back frame when vehicle deceleration is about one and one-half g-forces.

6. The automobile vehicle seat in accordance with claim 1, wherein the arc-shaped lower edge of the seat back frame comprises a notched circular sector.

7. The automobile vehicle seat in accordance with claim 6, wherein notches of the notched circular sector are asymmetrical and teeth defining the notched circular sector are directed rearwards.

8. The automobile vehicle seat in accordance with claim 6, wherein the lower edge of the seat back frame comprises, at a front extremity of the notched circular sector, a radial stop to engage with a tip of the cam.

* * * * *